Figure 1:
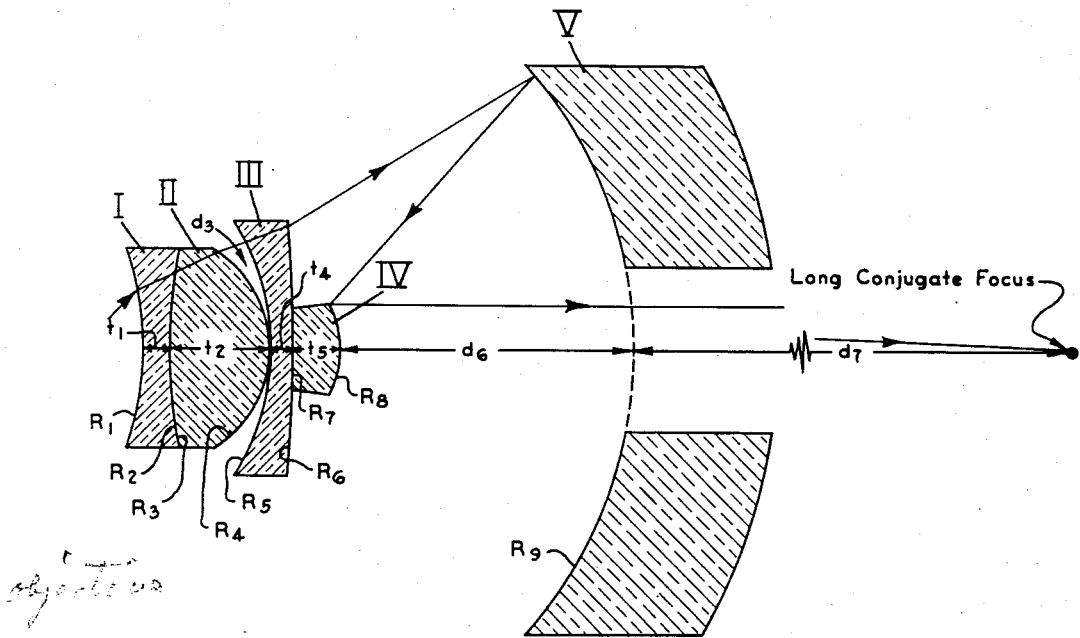

Aug. 29, 1950  D. S. GREY  2,520,633
OPTICAL SYSTEM
Filed Oct. 20, 1948  2 Sheets-Sheet 1

| COMPONENT | RADIUS | THICKNESS | MATERIAL |
|---|---|---|---|
| LENS I | $R_1 = -14.80$ | $t_1 = 1.357$ | Fused Quartz |
|  | $R_2 = +25.30$ |  |  |
| LENS II | $R_3 = +25.30$ | $t_2 = 4.923$ | Calcium Fluoride |
|  | $R_4 = -5.715$ | $d_3 = 0.034$ |  |
| LENS III | $R_5 = -11.51$ | $t_4 = 1.027$ | Calcium Fluoride |
|  | $R_6 = -72.39$ |  |  |
| MIRROR IV | $R_7 = -72.39$ | $t_5 = 2.384$ |  |
|  | $R_8 = -4.80$ | $d_6 = 14.619$ |  |
| MIRROR V | $R_9 = -20.80$ |  |  |
|  |  | $d_7 = 103.$ |  |

INVENTOR
David S. Grey
BY Donald C. Brown
and Moncure B. Berg
Attorneys

Aug. 29, 1950   D. S. GREY   2,520,633
OPTICAL SYSTEM
Filed Oct. 20, 1948   2 Sheets-Sheet 2

| COMPONENT | RADIUS | THICKNESS | MATERIAL |
|---|---|---|---|
| LENS VI | $R_{10} = -34.02$ | $t_8 = 1.02$ | Calcium Fluoride |
|  | $R_{11} = \infty$ | $d_9 = 4.59$ |  |
| LENS VII | $R_{12} = -22.5$ | $t_{10} = 1.02$ | Calcium Fluoride |
|  | $R_{13} = \infty$ |  |  |
| LENS VIII | $R_{14} = \infty$ | $t_{11} = 3.4$ | Sodium Chloride |
|  | $R_{15} = -37.0$ |  |  |
| LENS IX | $R_{16} = -37.0$ | $t_{12} = 1.02$ | Calcium Fluoride |
|  | $R_{17} = -160.9$ |  |  |

INVENTOR
David S. Grey
BY Donald C. Brown
and
Monroe B. Berg
Attorneys

Patented Aug. 29, 1950

2,520,633

UNITED STATES PATENT OFFICE 2,520,633

OPTICAL SYSTEM

David S. Grey, Weston, Mass., assignor to Polaroid Corporation, Cambridge, Mass., a corporation of Delaware Application October 20, 1948, Serial No. 55,588

8 Claims. (Cl. 88—57)

This invention relates to optical systems and more particularly has reference to systems useful in the fields of microscopy, photography and projection.

One object of this invention is to provide improved quality and range of achromatization in optical systems for use in microscope objectives, photographic objectives, projection objectives and the like and especially to provide systems of this character having improved performance and fewer component parts than have heretofore been used without resort to aspheric surfaces.

Still another object of the invention is the provision of novel objectives which are well corrected throughout a region of the electromagnetic spectrum ranging from the medium ultraviolet into the infrared and which comprise a plurality of optically aligned dioptric components and in optical alignment therewith a plurality of catoptric components, and especially to provide objectives of this character which are substantially free of astigmatism and which are corrected for spherical aberration and coma for differences in index of refraction caused by changes in refractive index of the order of 0.10 in accordance with variation of the wavelength of light throughout said wavelength range while maintaining the position of conjugate foci substantially constant.

A further object of this invention is to provide an achromatic objective for use in any part of the electromagnetic spectrum for which there is a transparent optical medium possessing a refractive index greater than 1.0.

A still further object of the invention is to provide an eyepiece for use with an objective of this character when employed in the field of microscopy and especially an eyepiece for photomicrography.

These and other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

Figure 2:
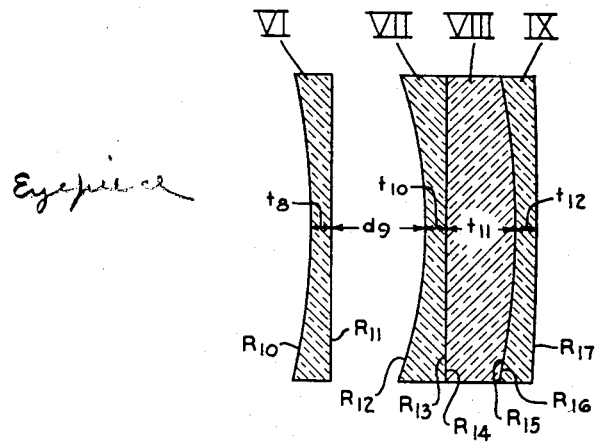

For a fuller understanding of the nature and objects of the invention, reference should be had to the following detailed description taken in connection with the accompanying drawings wherein:

. Figure 1 is a sectional view of an objective lens system embodying one form of the invention and especially adapted for microscopy; and Fig. 2 is a sectional view of an eyepiece adapted to be employed with the objective of Fig. 1 for photomicrography.

With reference to the drawings, Fig. 1 illustrates one embodiment of the invention showing an objective lens system comprising a plurality of optically aligned dioptric components and in optical alignment therewith a plurality of catoptric components. In Fig. 1, the dioptric components comprise refractive lens elements I, II and III. Lens element I is biconcave and lens element II is biconvex, the two elements being cemented together to provide a thick meniscus. Refractive lens element III is a concave-convex lens, the convex surface of which has small curvature.

The catoptric components of the objective comprise a mirror element IV having a continuous convex reflecting surface, and a concave mirror element V. Mirror IV may be mounted directly on the surface of the refractive element III most distant from the short conjugate focus of the objective with the reflecting surface thereof facing the long conjugate focus of the objective. The mirror element V is provided with an opening extending centrally therethrough, and has a continuous concave reflecting surface in surrounding relation to the opening. Mirror elements IV and V are positioned so that their reflecting surfaces face each other and are located on the side of the dioptric components which includes the long conjugate focus of the objective. To simplify the fabrication of the concave mirror element V, the member need not actually contain an opening therethrough. Instead, element V may be provided with an optical surface on both faces with the concave face thereof having an annular shaped area, reflection coated, to provide a centrally located uncoated area around the optical axis. Likewise, the convex mirror element IV may be provided by forming a reflection coating on the central portion of the surface of element III which is nearest to the concave mirror element V.

In Fig. 1, the full line with the arrows thereon illustrates the path direction of light traversing the objective when employed with a microscope and traces a marginal axial ray through the objective.

The dioptric components I, II and III are formed of optical media which are capable of transmitting ultraviolet radiation, visible light, and near infrared radiation. Examples of materials of this character are calcium fluoride, lithium fluoride, fused quartz, sodium chloride, potassium bromide, β-magnesium oxide, potassium chloride and the like. Of these materials, fused quartz and substantially pure or artificially grown crystals of calcium fluoride may be named as preferred. Materials of the character just noted are capable of transmitting light throughout a wavelength range of from below 2200 Å. to beyond 6000 Å., the wavelength range for which the objective is corrected.

The reflecting surfaces for the catoptric components of the objective are preferably coated with aluminum. Other materials may, however, be employed such, for example, as silver and the like to provide reflection coatings.

Table 1 below gives the constructional data with dimensions in millimeters, for the specific example of the lens system illustrated in Fig. 1.

Table 1

| Component | Radius | Thickness | Material |
| --- | --- | --- | --- |
| Lens I | $R_1 = -14.80$ | $t_1 = 1.357$ | Fused Quartz. |
|  | $R_2 = +25.30$ |  |  |
| Lens II | $R_3 = +25.30$ | $t_2 = 4.923$ | Calcium Fluoride. |
|  | $R_4 = -5.715$ |  |  |
|  |  | $d_3 = 0.034$ |  |
| Lens III | $R_5 = -11.51$ | $t_4 = 1.027$ | Do. |
|  | $R_6 = -72.39$ |  |  |
| Mirror IV | $R_7 = -72.39$ | $t_5 = 2.384$ |  |
|  | $R_8 = -4.80$ |  |  |
|  |  | $d_6 = 14.619$ |  |
| Mirror V | $R_9 = -20.80$ | $d_7 = 103$ |  |

Table 2 below gives representative ultraviolet indices of the preferred materials. These indices were computed by least square curve fitting from values in the International Critical Table.

Table 2.—Refractive index $(n)$[1]

| Wavelength | Calcium fluoride | Fused quartz | Sodium chloride |
| --- | --- | --- | --- |
| 2200 Å | 1.48111 | 1.52861 | 1.71550 |
| 2400 Å | 1.47123 | 1.51347 | 1.67166 |
| 2700 Å | 1.46093 | 1.49811 | 1.63167 |
| 3200 Å | 1.45057 | 1.48282 | 1.59537 |
| 4000 Å | 1.44187 | 1.47022 | 1.56771 |

[1] Ultraviolet indices of calcium fluoride, fused quartz and sodium chloride were computed by least squares method from values in the International Critical Tables.

An eyepiece, especially designed for use with the objective of Fig. 1 is shown in Fig. 2. This eyepiece may comprise a modification of a standard aplanatic eyepiece and makes use of optical materials which transmit throughout the extended wavelength range of the objective heretofore noted. The eyepiece of Fig. 2 employs four dioptric components comprising the plano-concave element VI and spaced therefrom the plano-concave element VII, the plano-convex element VIII and the concave-convex element IX, the last-named three elements being cemented together to form a meniscus. Other types of eyepieces for use in the visual spectrum could similarly be converted to use in the ultraviolet. Lens materials useful in the eyepiece of Fig. 2 are similar to those already mentioned. In the specific construction disclosed, elements VI, VII and IX are of calcium fluoride and element VIII is of sodium chloride. The eyepiece of Fig. 2 when used with the objective of Fig. 1 is located so that a conjugate focus thereof is near the long conjugate focus of the objective. The eyepiece of Fig. 2 has a focal length of minus 38 mm.

The table below gives constructional data, with dimensions in millimeters, for the eyelens illustrated, by way of example, in Fig. 2 of the drawings.

Table 3

| Component | Radius | Thickness | Material |
| --- | --- | --- | --- |
| Lens VI | $R_{10} = -34.02$ | $t_8 = 1.02$ | Calcium Fluoride. |
|  | $R_{11} = \infty$ |  |  |
|  |  | $d_9 = 4.59$ |  |
| Lens VII | $R_{12} = -22.5$ | $t_{10} = 1.02$ | Do. |
|  | $R_{13} = \infty$ |  |  |
| Lens VIII | $R_{14} = \infty$ | $t_{11} = 3.4$ | Sodium Chloride. |
|  | $R_{15} = -37.0$ |  |  |
| Lens IX | $R_{16} = -37.0$ | $t_{12} = 1.02$ | Calcium Fluoride. |
|  | $R_{17} = -160.9$ |  |  |

Schwarzschild in 1905 described a method of combining a convex mirror and a concave mirror to obtain an optical system of large numerical aperture known as the Schwarzschild aplanatic pair. Maksutov in the 1930's, and more recently Burch, have described means of adapting the Schwarzschild aplanatic pair to objectives suitable for use in microscopy. These objectives of the prior art are similar in appearance to that of Fig. 1 if the dioptric components or elements I, II and III are omitted from the illustrated design and hence consist essentially of a concave mirror element and a convex mirror element.

A defect inherent in the Schwarzschild aplanatic pair is that the convex mirror obscures the central portion of the aperture. This obscuration causes a certain portion of the energy transmitted by the optical system or objective to appear outside the central disc of the diffraction pattern. About 85% of the transmitted energy appears in the central disc of the diffraction pattern of an optical system which is free of aberrations and which has a circular unobscured aperture. If a small central portion of the aperture is obscured, the percent of energy falling within the central disc is 85% minus the obscuring ratio $a/A$, where $a$ is the obscured area and $A$ is the area of the free aperture before obscuration. This deterioration of the diffraction pattern is further increased by the presence of supporting members as used by the prior art to hold the convex mirror. Another defect of the Schwarzschild pair of mirrors is that if spherical surfaces are used, the useful numerical aperture is limited by zonal spherical aberration. For microscopy, this limitation occurs at a numerical aperture of about 0.5. The present invention makes use of spherical refractive surfaces in conjunction with spherical reflecting surfaces to overcome these defects.

As shown by Burch, the mirrors may be made aspheric and the obscuring ratio reduced to any desired value at numerical apertures up to about 0.65. If the mirrors have spherical surfaces instead of aspheric surfaces, the obscuring ratio $a/A$ is about 0.15 to 0.2 and 15 to 20 percent of the radiation passed by the aperture is caused by the obscuration to fall outside the central diffraction disc. As affects image quality, this deterioration of the diffraction pattern is similar to a small amount of residual aberration.

The generally accepted standard for practical perfection in reduction of aberrations, as formulated by Rayleigh, is that defects do not cause more than 20 percent of the transmitted radiation to appear outside the central diffraction disc in addition to the 15 percent loss of a perfect system. Since the effect of small residual aberrations and small obscuring ratios are similar in effect on the image, it is reasonable to extend Rayleigh's standard of practical perfection to mean that the obscuration plus the residual aberrations do not cause more than 20 percent of the transmitted radiation to fall outside the central diffraction disc. If the obscuring ratio is allowed to approach 20 percent, the tolerance on excellence of design and execution to meet the Rayleigh criterion becomes severe. If the obscuring ratio is 10 percent or less there is still left a tolerance on design and execution which may be readily satisfied. This is particularly true because the relationship between small imperfections and loss of image quality is not linear. Design and execution of the design do not by any means need to be twice as good to satisfy the 10 percent tolerance as to satisfy the 20 percent tolerance. From the foregoing it will be appreciated that an obscuring ratio of 0.1 does not violate the most critical standards of optical performance. It is desirable of course, but not necessary, to reduce this value further and it is permissible to allow it to become slightly larger if the design and execution are correspondingly bettered.

It has been found that refracting surfaces, used between the concave mirror and the short conjugate focus, permit reduction of the obscuring ratio to less than 0.1, and reduce zonal spherical aberration and coma sufficiently so that at numerical apertures greater than 0.7, the Rayleigh criterion may be satisfied. This design may be effected without optical contact between the lens and the short conjugate focus. If a lens surface is allowed to be in contact with the short conjugate focus, the numerical apertures quoted above may be multiplied by the index of that lens. This is possible because the "dry" objective may allow a sufficiently large distance between the short conjugate focus and the lens surface nearest thereto so that it may be converted to an immersion objective by the addition of a component placed in contact with the short focus at one surface and having the other surface described with the center of curvature approximately at the short focus.

It has been found best to insert refractive elements between the short conjugate focus and the convex mirror of Fig. 1. It is also desirable that one of the refractive elements, for example, the element III, be close to the convex mirror and may thus provide a support for the convex mirror. It is possible, under certain conditions, to use either or both of the reflecting surfaces as refracting surfaces also. Then, the convex mirror element is a convex lens, with the center of the lens silvered, aluminized, or similarly coated to provide a mirror. The concave mirror becomes a concave lens which is reflection coated except at the center.

While Maksutov shows a weak lens between the convex mirror and the long conjugate focus, the function of this lens is only to compensate for chromatic aberration introduced by a cover slide over the short conjugate focus. While showing the use of a hemisphere at normal incidence, that is with the center at the short conjugate focus, Burch does not use refractive elements to produce compensation of aberrations which permit correction of the defects of the Schwarzschild pair without resort to aspheric surfaces. In distinction, this invention makes use of refractive components which in themselves introduce amounts of spherical aberration and coma and which permit an arrangement of mirrors of low obscuring ratio and large numerical aperture without resort to aspherical surfaces. The angles of incidence at the dioptric surfaces disclosed in the drawings are therefore necessarily large particularly because in large aperture systems it is insufficient that only the third order, or primary aberrations, of the catoptric components be compensated. The angles of incidence at the dioptric surfaces must be large enough to provide higher order spherical aberration of sufficient magnitude to overcome, at least in part, the higher order aberrations of the mirrors.

When a large amount of refraction occurs at a lens surface, chromatic aberration is necessarily introduced. It is desirable that the refractive components not only compensate the aberrations of mirrors at one wavelength of incident radiation but that a useful system should be provided which possesses stability of correction over a large wavelength interval. I have found that the refractive components for a system may be so arranged that the correction is stable for changes in index of about 0.1. It is possible to perform the elimination of change in aberration with wavelength by use of only one refractive material, though it is helpful to use two materials of different dispersion. Since correction is possible with only one optical medium, design may be adapted to any wavelength of the electromagnetic spectrum in which there is a transparent optical medium of refractive index greater than 1.0. The objective system illustrated is corrected for the visible spectrum and large portions of the infrared and ultraviolet spectra simultaneously.

In this invention various arrangements of the dioptric components are possible and the arrangement of the catoptric components depends on the selective reflecting surfaces. To achieve a satisfactorily small obscuring ratio it is desirable that the ratio of the paraxial incident height at the concave mirror to the paraxial incident height at the convex mirror be about 3 or larger. This condition holds for the mirror elements IV and V of Fig. 1. To achieve compactness this ratio should not be excessive. Unless this ratio of paraxial incident heights becomes extremely large, the contribution of the concave mirror to third order spherical aberration is greater than the contribution of the convex mirror, and of opposite sign. The concave mirror contributes spherical aberration of the algebraic sign designated by undercorrection.

Though the concave mirror, at reasonably small separations, dominates the third order spherical aberration, the relative contribution of the convex mirror to higher orders of spherical aberration has been found to be greater than the relative contribution of the concave mirror. Therefore, if zonal spherical aberration is to be satisfactorily small, the dioptric components of Fig. 1 should supply overcorrected third order spherical aberration and undercorrected higher order spherical aberration. It has been found possible to realize this condition if the dioptric components present a surface of spherical overcorrection and a surface of spherical undercorrection, the surface of spherical undercorrection being situated the nearer to the short conjugate focus. If a very large ratio of paraxial incident height on the concave mirror to paraxial incident height on the convex mirror is permitted, the dioptric surface of spherical overcorrection is not essential, particularly if very large numerical apertures are not desired. Other than for satisfying the requirement just described, considerable freedom is offered to select the powers and bendings of the components in such a manner as to eliminate third order spherical aberrations, coma and astigmatism and chromatic aberration according to conventional practice as is the case in the illustrated objective. Purely refractive microscope objectives when achromatized do not permit elimination of astigmatism without resort to aspheric surfaces. It has been found helpful in the control of secondary spectrum over extreme wavelength ranges to use, as the refractive component nearest the convex mirror, a surface which is plano, concave, or only slightly convex, that is, less convex than the surface which would admit, at normal incidence, rays emanating from an axial point. This condition is not by any means necessary to achievement of an apochromatic design, but is, however, helpful when the region of control of secondary spectrum is to be extended as far as possible in the ultraviolet and the infrared. On the other hand, if correction of secondary spectrum is restricted to visible light this last condition may be radically violated.

Dioptric components located between the convex mirror and the long conjugate focus may be used to advantage, particularly in regard to control of certain extra-axial aberrations. It has not been found possible, by use of these latter dioptric components, to eliminate the dioptric components between the concave mirror and the short conjugate focus. Dioptric components located on the long conjugate side, in addition to providing convenience in solving for routine elimination of third order spherical aberration, coma, and astigmatism, also provide means of solving for the Petzval condition, distortion, higher orders of coma, and lateral chromatic aberration.

The function of the dioptric surfaces may be discussed in connection with the illustrated example. In Fig. 1, the surface having radius $R_6$ is of weak positive power. This configuration fulfills two functions in that it assists in attaining freedom from chromatic aberrations over a large spectral interval, and it provides the surface of spherical overcorrection. Intervening dioptric surfaces are used to solve, according to methods known to the art, for elimination of spherical aberration, coma, astigmatism and chromatic aberration when used in conjunction with the catoptric components and the outer dioptric surfaces, respectively, of radii $R_1$ and $R_6$. It was found possible to obtain a solution for these aberrations by use of an arrangement in which there are but two simple dioptric elements of the same general shape as shown in Fig. 1. This arrangement is not quite sufficiently free of variation of spherical aberration with wavelength of incident light to permit its use at numerical aperture 0.7 and wavelengths from 2200 Å. to 6000 Å. units. The dioptric element nearest the short conjugate focus was compounded, as shown in Fig. 1, to extend the elimination of variation spherical aberration with wavelength over its exceedingly large wavelength interval.

The objective illustrated in Fig. 1 is computed specifically for use as a microscope objective and therefore allows for a cover slide of quartz .18 mm. in thickness. The working distance from surface $R_1$ to the cover slide is 2.1 mm. and the magnification between long and short conjugate focal surfaces is 53×. The objective of Fig. 1 has a numerical aperture of 0.72.

While specifically disclosed by way of illustration for use as a microscope objective with the light traversing the optical system in the direction from the short conjugate focus to the long conjugate focus, direction of the light path may be reversed for other applications such as a photographic objective. For use as a photographic objective and for a projection objective, the correction for color slide thickness might be altered and in particular it might be changed to zero. For these other uses it might be desired to alter the long conjugate focal distance for which the objective is corrected by bending the components in the manner heretofore set forth in this application as will be well understood to the art. A method of great convenience in altering the long conjugate focal distance for which the objective is corrected has been found to consist merely of a minute change in the spacing between the convex and concave reflecting surfaces. The spherical aberration may, by this means, be adjusted over a large range of magnifications. The coma correction remains essentially complete.

While the optical systems of my invention have been shown in conjunction with optical media which transmit ultraviolet, visible and infrared radiations, it is to be understood that the designs set forth may be carried out with other optical materials which however, have a transmission over a more limited wavelength range. For example, the systems disclosed herein are well adapted to be carried out with optical media which will not transmit ultraviolet radiations but will transmit visible light, as for example, glass and the like.

"Mirror element" as used herein is understood to comprise the reflecting surface of a member bearing said reflecting surface or a member supporting said reflecting surface. Specifically it refers to that portion of the surface which is reflection coated.

From the foregoing it may be observed that in accordance with the teaching set forth, I have fulfilled the objects and novel aims of my invention and have provided novel and improved optical systems for the various uses noted herein.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. In a lens system providing a microscope objective, a photographic objective, a projection objective and the like for use throughout a wavelength range extending from within the medium ultraviolet region of the spectrum to within the infrared region, a plurality of optically aligned catoptric components and in optical alignment therewith a plurality of dioptric components which are located on the side of the catoptric components that includes the short conjugate focus of said objective, said catoptric components comprising a pair of mirror elements, the first mirror element having an opening extending centrally therethrough and, in surrounding relation to said opening, a continuous concave reflecting surface on the face thereof facing said dioptric components, the second mirror element having a continuous convex reflecting surface facing said concave reflecting surface and located between said first mirror element and said dioptric components, and said dioptric components comprising a plurality of refractive elements formed individually of material capable of transmitting light throughout said wavelength range and correcting said catoptric components for spherical aberration and coma for differences in index of refraction caused by changes in refractive index of the order of 0.10 in accordance with variation in the wavelength of light throughout said range while maintaining the position of the conjugate foci of the objective substantially constant for any said difference and, together with said catoptric components, providing an objective having a numerical aperture at least as great as 0.5, said second mirror element being mounted closely adjacent that refractive surface of said dioptric components most distant from said short conjugate focus and partially obscuring a small central portion of said refractive surface for the transmission of light therethrough.

2. A microscope objective as defined in claim 1 wherein said first and second mirror elements are spaced apart by a distance selected to provide a paraxial incident height on the concave reflecting surface of said first mirror element which is at least three times greater than the paraxial incident height on the convex reflecting surface of said second mirror element.

3. A microscope objective as defined in claim 1 wherein said second mirror element is mounted directly on that refractive surface of said dioptric components most distant from the short conjugate focus of said objective and wherein said second mirror element obscures not more than 10% of light incident on said refractive surface.

4. A lens system for use as a microscope objective, a photographic objective and a projection objective with light of a wavelength range extending from within the medium ultraviolet region of the spectrum to within the infrared region of the spectrum, which comprises a plurality of catoptric components aligned on the optical axis of the objective and a plurality of dioptric components in optical alignment with said catoptric components on the side of said catoptric components which includes the short conjugate focus of said objective, said catoptric components comprising a pair of mirror elements, the first mirror element having an opening which extends centrally therethrough and which is centered on said optical axis and, in surrounding relation to said opening, a continuous concave reflecting surface on that face of said mirror element facing said dioptric components, the second mirror element having a continuous convex reflecting surface facing said concave reflecting surface located between said first mirror element and said dioptric components at a spacing from said concave reflecting surface of said first mirror element selected to provide a paraxial incident height on said concave reflecting surface of at least three times the paraxial incident height on the convex mirror, and said dioptric components comprising a plurality of refractive elements formed individually of material capable of transmitting light throughout said wavelength range and correcting said catoptric components for spherical aberration and coma for differences in index of refraction caused by changes in refractive index of the order of 0.10 in accordance with variation in the wavelength of light employed while maintaining the position of the conjugate foci of the objective substantially constant for any said difference and together with said catoptric components providing an objective having a numerical aperture of at least 0.5, said second mirror element being mounted on that refractive surface of said dioptric components most distant from said short conjugate focus and partially obscuring said refractive surface whereby a maximum of 10% of the light ordinarily incident on said refractive surface is prevented from passing therethrough.

5. A lens system for use as a microscope objective, a photographic objective and a projection objective with light throughout a wavelength range extending from within the medium ultraviolet region of the spectrum to within the infrared region, which comprises a plurality of catoptric components aligned on the optical axis of the objective and a plurality of dioptric components in optical alignment with said catoptric components on the side of said catoptric components which includes the short conjugate focus of said objective, said catoptric components comprising a pair of mirror elements, the first mirror element having an opening which extends centrally therethrough and which is centered on the optical axis and, in surrounding relation to said opening, a continuous concave reflecting surface on that face of said mirror element facing said dioptric components, the second mirror element having a continuous convex reflecting surface facing said concave reflecting surface located between said first mirror element and said dioptric components, and said dioptric components comprising a plurality of refractive elements formed individually of fused quartz and of calcium fluoride correcting said catoptric components for spherical aberration and coma for differences in index of refraction caused by changes in refractive index of the order of 0.10 in accordance with variation in the wavelength of light employed while maintaining the position of the conjugate foci of the objective substantially constant for any said difference and together with said catoptric components providing an objective which is substantially free of astigmatism and which has a numerical aperture at least as great as 0.5, said second mirror element being mounted closely adjacent that refractive surface of said dioptric components most distant from said short conjugate focus and partially obscuring a small central portion of said refractive surface for the transmission of light therethrough.

6. A microscope optical system for conducting observation throughout a wavelength range extending from within the medium ultraviolet region of the spectrum to within the infrared region, which comprises, in combination, an objective having a plurality of optically aligned catoptric components and in optical alignment therewith and as part of said objective a plurality of dioptric components which are located on the side of said catoptric components which includes the short conjugate focus of said objective, and, in optical alignment with said objective and completing said system, an eyepiece which comprises a plurality of dioptric components and which is positioned with one conjugate focus thereof at least closely adjacent the long conjugate focus of said objective, said catoptric components of said objective comprising a pair of mirror elements, the first mirror element having an opening extending centrally therethrough and, in surrounding relation to said opening, a continuous concave reflecting surface on the face thereof facing said dioptric components of said objective, the second mirror element having a continuous convex reflecting surface facing said concave reflecting surface and located between said first mirror element and said dioptric components of said objective, all said dioptric components of said optical system comprising refractive elements formed individually of material capable of transmitting light throughout said wavelength range and said dioptric components of said objective correcting said catoptric components for spherical aberration and coma for differences in index of refraction caused by changes in refractive index of the order of 0.10 in accordance with variation in the wavelength of light employed while maintaining the position of the conjugate foci of the objective substantially constant for any said difference and together with said catoptric components providing an objective having a numerical aperture at least as great as 0.5, said second mirror element being mounted closely adjacent that refractive surface of said dioptric components of said objective most distant from the short conjugate focus of the objective and partially obscuring a small central portion of said refractive surface for the transmission of light therethrough.

7. A microscope objective, a photographic objective, a projection objective and the like which is substantially free of astigmatism and which is corrected for spherical aberration and coma for differences in index of refraction caused by changes in refractive index of the order of 0.10 in accordance with variation of the wavelength of light throughout a wavelength range extending from within the medium ultraviolet region of the spectrum to within the infrared region of the spectrum while maintaining the position of the conjugate foci of said objective substantially constant for wavelengths within said range, said objective comprising a plurality of optically aligned catoptric components which are at least partially uncorrected for optical aberrations and in optical alignment therewith a plurality of dioptric components which are also at least partially uncorrected for optical aberrations and which are located on the side of the catoptric components that includes the short conjugate focus of said objective, said catoptric components comprising a pair of mirror elements, the first mirror element having an opening extending centrally therethrough and, in surrounding relation to said opening, a continuous concave reflecting surface on the face thereof facing said dioptric components, the second mirror element having a continuous convex reflecting surface facing said concave reflecting surface and located between said first mirror element and said dioptric components, and said dioptric components comprising a plurality of refractive elements which are formed individually of material capable of transmitting light throughout said wavelength range and which introduce into said objective optical aberrations substantially equal but opposite in sign to the optical aberrations introduced into the objective by said catoptric components and which, together with said catoptric components, provide an objective having a numerical aperture at least as great as 0.5, said second mirror element being mounted closely adjacent that refractive surface of said dioptric components most distant from said short conjugate focus and partially obscuring a small central portion of said refractive surface for the transmission of light therethrough.

8. In a lens system providing a microscope objective, a photographic objective, a projection objective and the like for use throughout a wavelength range extending from within the medium ultraviolet region of the spectrum to within the infrared region, a plurality of optically aligned catoptric components and in optical alignment therewith a plurality of dioptric components which are located on the side of the catoptric components that includes the short conjugate focus of said objective, said catoptric components comprising a pair of mirror elements, the first mirror element having a light-transmitting portion extending centrally therethrough and, in surrounding relation to said portion, a continuous concave reflecting surface on the face thereof facing said dioptric components, the second mirror element having a continuous convex reflecting surface adapted to face said concave reflecting surface and positioned between said first mirror element and said dioptric components adjacent that refractive surface of said dioptric components most distant from said short conjugate focus whereby to partially obscure a small central portion of said refractive surface for the transmission of light therethrough, and said dioptric components comprising a plurality of refractive elements formed individually of material capable of transmitting light throughout said wavelength range and correcting said catoptric components for spherical aberration and coma for differences in index of refraction caused by changes in refractive index of the order of 0.10 in accordance with variation in the wavelength of light throughout said range while maintaining the position of the conjugate foci of the objective substantially constant for any said difference and together with said catoptric components providing an objective having a numerical aperture at least as great as 0.5.

DAVID S. GREY.

REFERENCES CITED

The following references are of record in the file of this patent:

UNITED STATES PATENTS

| Number | Name | Date |
| --- | --- | --- |
| 2,141,884 | Sonnefeld | Dec. 27, 1938 |
| 2,198,014 | Ott | Apr. 23, 1940 |
| 2,206,155 | Boegehold | July 2, 1940 |
| 2,324,081 | Herzberger | July 13, 1943 |
| 2,380,887 | Warmisham | July 31, 1945 |
| 2,380,888 | Warmisham | July 31, 1945 |
| 2,403,660 | Hayward | July 9, 1946 |
| 2,413,286 | Buchele | Dec. 31, 1946 |

FOREIGN PATENTS

| Number | Country | Date |
| --- | --- | --- |
| 82,671 | Germany | Aug. 7, 1895 |
| 544,694 | Great Britain | Apr. 23, 1942 |